United States Patent
Reinecke

[11] 3,724,607
[45] Apr. 3, 1973

[54] AUTOMATIC SLACK ADJUSTING DEVICE FOR A BRAKE LEVER

[75] Inventor: Erich Reinecke, Hannover, Germany

[73] Assignee: Westinghouse Bremsen-Und Apparatebau, GmbH, Hannover, Germany

[22] Filed: Feb. 22, 1971

[21] Appl. No.: 117,372

[30] Foreign Application Priority Data

Feb. 21, 1970 Germany..................P 20 08 139.4

[52] U.S. Cl..........................188/79.5 K, 188/196 BA
[51] Int. Cl............................................F16d 65/56
[58] Field of Search...................188/79.5 K, 196 BA

[56] References Cited

UNITED STATES PATENTS

| | | | |
|---|---|---|---|
| 2,920,724 | 1/1960 | Margetic et al. | 188/79.5 K X |
| 3,314,508 | 4/1967 | McGregor | 188/79.5 K X |
| 3,602,342 | 8/1971 | Whittle | 188/79.5 K X |

*Primary Examiner*—Duane A. Reger
*Attorney*—Ralph W. McIntire, Jr.

[57] ABSTRACT

This invention relates to an automatic slack adjuster arrangement for the brake lever of the brake cam shaft of the brake, especially for street vehicles, with the worm wheel arranged on the brake cam shaft and in engagement with the worm that is positioned on the worm shaft that is rotatably mounted in the brake lever which, as soon as wear of the brake shoe occurs, rocks through an angle that exceeds the permissible value. This additional rocking of the brake lever adjusts the position of the brake lever in the manner hereinafter explained.

6 Claims, 7 Drawing Figures

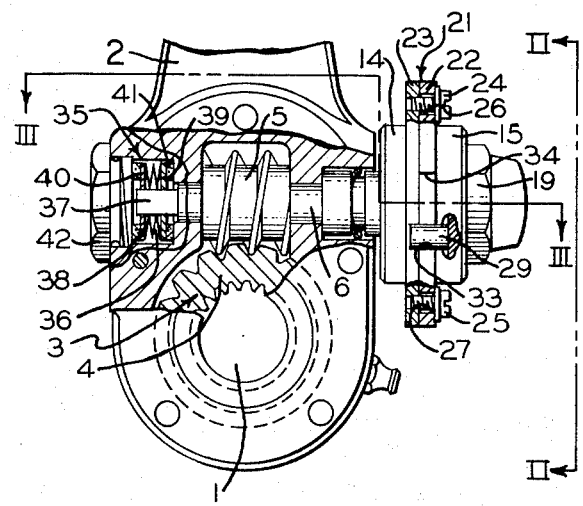
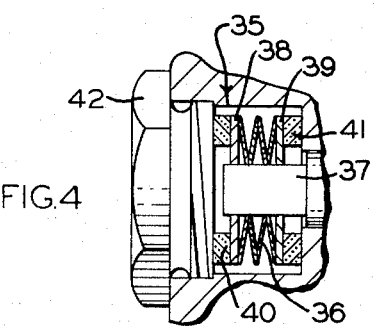
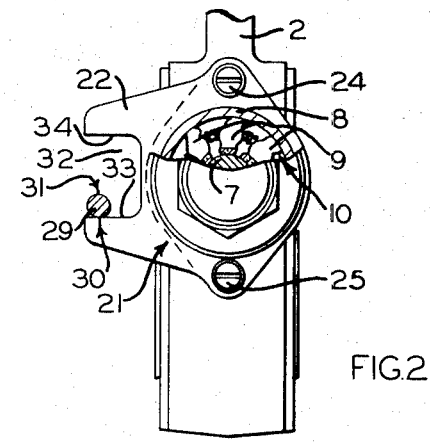
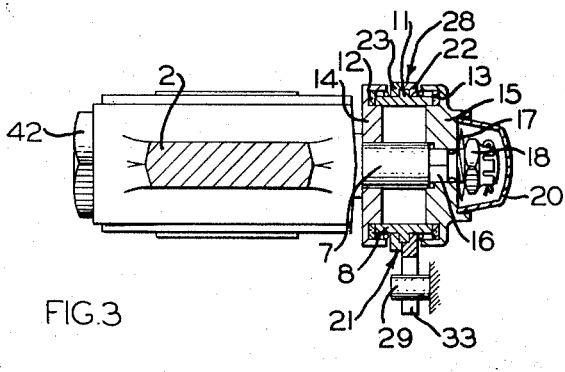

INVENTOR.
ERICH REINECKE
BY Ralph W. McIntire, Jr.
ATTORNEY

AUTOMATIC SLACK ADJUSTING DEVICE FOR A BRAKE LEVER

The present application concerns itself with an automatic slack adjuster arrangement in which there is arranged on the worm shaft the slack adjusting lever that is connected with it by means of a coupling that operates in only one direction of rotation of the brake lever and is arranged at an angle of 90° to the brake lever. The rocking movement of the brake lever subsequent to engagement with one of two contacts that are secured on the vehicle part which is at rest, is limited in such a manner that the position of the brake lever is automatically adjusted in stages to compensate for slack.

The invention has for its purpose to design such an automatic slack adjuster arrangement so that it operates, upon an increase in brake shoe wear, automatically to take up slack without the reduction or the removal of the arrangement of the parts and therefore is more easily carried out.

This takes place in accordance with the conditions of the invention whereby the slack adjusting lever and the coupling are connected by the means of a releasable connection upon rocking of the brake lever in one direction and are released one from the other so that they are rotatable relative to each other upon rocking of this lever in an opposite direction. In the practical manner, the connection is constructed as a power coupled connection.

In an additional design of the invention, it is intended that the slack adjuster lever be constructed in two parts and that both of these lever parts are rotatable on the coupling ring and by the means of a screw connection can be secured to each other whereupon a clamped connection between both parts of the lever and a collar of the coupling that is disposed therebetween is produced.

Furthermore, there is provided in accordance with the second embodiment of the invention that each lever part has a contact surface that abuts one side of a stationary contact. Both lever parts may be connected with each other by the means of a releasable screw connection. An additional screw connection is provided in such a manner that when both lever parts are unrotatable relative to each other, they can, however, both be commonly rotated on the coupling ring.

It is advantageous in that both screw connections are constructed by means of locking screws which are guided in arcuate slots in the one lever part and screw-threaded into screw-threaded bores in the other lever part.

In the following description, two typical design examples of the invention are further explained with reference to the drawings:

In the accompanying drawings:

FIG. 1 shows an automatic slack adjuster arrangement constructed in accordance with one embodiment of the invention.

FIG. 2 shows a side view of the slack adjuster arrangement of FIG. 1 looking in the direction of the arrows II in FIG. 1.

FIG. 3 is a cross-sectional view cut through the slack adjuster arrangement of FIG. 1 in accordance with the line III—III in FIG. 1.

FIG. 4 is an enlarged view of a friction brake for preventing unintentional rotation of the worm shaft shown in FIG. 1.

Figure 5:
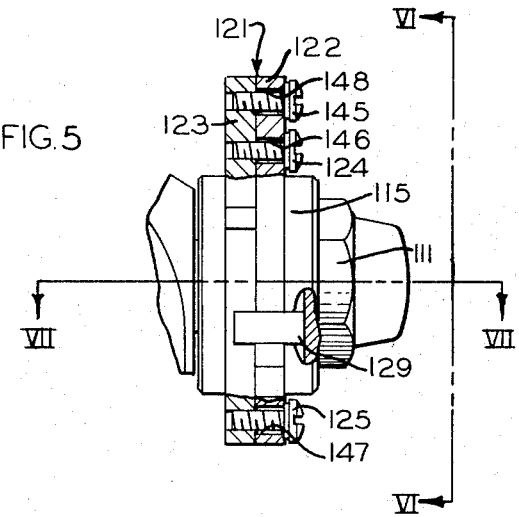
FIG. 5 is a partial view of a slack adjuster arrangement constructed in accordance with a second embodiment of the invention.

Referring now to FIGS. 1, 2, and 3, the brake cam shaft is designated with the reference 1 and on it there is arranged the brake lever 2. The slack adjuster arrangement 3 comprises the worm wheel 4 that is arranged securely on the brake cam shaft 1 and the worm 5 that is in engagement with it and whose worm shaft 6 is located so as to be rotatable in the brake lever 2 and is arranged at a right angle to the brake cam shaft 1.

On the end of the worm shaft 6 that extends in the direction of the right hand out from the brake lever 2, there is arranged the free wheeling coupling 10 that consists of the coupling ring 8 and a plurality of clamping or locking members 9. The ring 8 is provided with a collar 11 that is arranged coaxially to the worm shaft 6.

As shown in FIG. 3, on both sides of the coupling ring 8 there are arranged friction linings 12 and 13 which in addition to abutting the coupling ring 8 also abut the carrier discs 14 and 15. The carrier disc 15 is mounted on the square 16 which is integral with the worm shaft 6 so as to rotate with this shaft. However, it is axially displaceable. Both carrier discs 14 and 15 are axially mounted on the portion 7 of the worm shaft 6 by means of the nut 18 that adjustably compresses the plate spring 17. Thus the bearing force of discs 14 and 15 on the friction linings 12 and 13 is adjustable by rotating the nut 18. These carrier discs 14 and 15 also abut the friction linings 12 and 13 to prevent contaminants from entering the inside of the free wheeling coupling 10.

A hexagonal head 19 that is formed on one side of the carrier disc 15 serves to rotate the carrier disc 15 and therewith the worm shaft 6 that is integral with the square 16 upon placing a wrench on head 19. The protection cap 20 carried in a recess formed in head 19 and disc 15 protects the end 7 of the worm shaft 6 together with the plate spring 17 and the nut 18 from shock and contamination.

The slack adjusting lever 21 consists of two lever parts 22 and 23 that are mounted on the coupling ring 8 and are secured to each other by the means of the clamp lock screws 24 and 25 so that the collar 11 of the coupling ring 8 is clamped between the lever parts 22 and 23. The screws 24 and 25 extend through bores 26 and 27 (FIG. 1) in the lever part 22 and are screwed into screw-threaded bores provided in the lever part 23.

The lever parts 22 and 23 that are secured one with the other to the collar 11 of the coupling ring 8 that is clamped therebetween forms the clamp connection 28 which securely connects the slack adjusting lever 21 and the coupling 8 one with the other. The clamp connection 28 is easily releasable by means of loosening the clamp lock screws 24 and 25. If the clamp connection 28 is released, then the lever parts 22 and 23 are rotatable on the coupling ring 8.

The stud 29 is secured to a stationary part of the vehicle that is at rest in relation to the rotation of the brake lever 2 and has thereon two contacts 30 and 31. By the means of the cavity 32 in the lever part 22, there are formed two contact surfaces 33 and 34 which are respectively movable into abutting relation with the contacts 30 and 31.

In order to prevent an unintentional adjustment of the worm shaft 6, there is shown mounted on this shaft the friction brake 35 comprising four Belleville springs 36 which press the two discs 38 and 39, that are arranged on the square 37 of the worm shaft 6, against two friction linings 40 and 41. The outer friction lining 40 is abutted against the closing screw 42 that is screwed into a screw-threaded bore provided in the brake lever 2.

The manner of operation of the automatic slack adjuster arrangement in accordance with the conditions of the invention shown in FIGS. 1, 2, and 3 is as follows:

In the illustrated position of the brake lever 2, the brake is released. The slack adjusting lever 21 is in the position in which the contact surface 33 thereon abuts the contact surface 30 on the stud 29 that is carried by a stationary part of the vehicle.

Upon the application of the brake, the brake cam shaft 1 is rotated by the means of the brake lever 2 since the worm 5 transfers the brake lever moment to the worm wheel 4 which is mounted on the brake cam shaft 1. Since the pair, the worm wheel 4 and the worm 5, are automatic locking, no rotation of the worm wheel 4 and worm 5 can take place.

The worm shaft 6 with the shaft end 7, the free wheeling coupling 10 and the slack adjusting lever 21 are rocked clockwise, as viewed in FIG. 1, simultaneously around the axis of the brake cam shaft 1 together with the brake lever 2. If the length of the arcuate path of the brake lever 2 as a consequence of brake shoe wear exceeds the established permissible limiting value, then the contact 34 on the lever part 22 of the slack adjusting lever 21 is moved into abutting contact with the contact 31 so that, with the additional clockwise rocking of the brake lever 2, the slack adjusting lever 21 and the coupling ring 8 that is securely connected to it by the means of the clamp connection 28 are rotated clockwise, as viewed in FIG. 2, around the axle of the worm shaft 6 which is in the direction of rotation in which the clamping members 9 are not clamped, that is, released from the coupling ring 8. Since in this direction of rotation, the free wheeling coupling 10 remains released, the worm shaft 6 is not rotated as the lever parts 22 and 23 of slack adjuster lever 21 are rotated clockwise, as viewed in FIG. 2, by consequence of the loading by the means of the brake lever moment that is transferred thereto by the stationary stud 29. Therefore, an angular adjustment of the slack adjusting lever 21 is effected relative to the worm shaft 6.

When the brake is subsequently released, the brake lever 2 is rocked back to its initial position. As a consequence of the adjustment of the slack adjusting lever 21 relative to the worm shaft 6 that was effected while the brake application was in effect, the contact surface 33 on slack adjusting lever 21 now meets with the contact surface 30 on the stationary stud 29 before the brake lever 2 once again attains its initial release position so that with the further rocking of the brake lever 2 to its original release position, the slack adjusting lever 21 and the coupling ring 8 that is securely fastened to it by the means of the clamp connection 28 once again are turned counterclockwise, as viewed in FIG. 2, back to the initial position in which the clamp bodies 9 are clamped to coupling ring 8. The worm shaft 6 now, since no more brake moment is transferred, is taken along through the presently operating free wheeling coupling 10 without large friction resistance and is rotated thereby so that the brake lever 2 is rotated on the brake cam shaft 1 an amount that corresponds to the brake shoe wear and thus is automatically adjusted.

The friction brake 35 prevents an unintentional adjustment of the brake lever.

If an increase in the brake shoe clearance is required, as for an example when new brake shoes are applied, then the clamp connection 28 is released by the means of the clamp lock screws 24 and 25 and the worm shaft 6 is manually rotated back so far by the means of an appropriate tool such as, for example, a wrench that can be positioned on the hexagonal head 19, until the brake lever 2 once again attains the desired initial position to provide the proper clearance for the new brake shoes. The slack adjusting lever 21 that is released by the means of the coupling 8 is thereby held back by the means of the stud 29.

If the brake lever is once again found thus in the desired initial position, then the clamp lock screws 24 and 25 are once again tightened whereupon the slack adjusting lever 21 is once again connected with the coupling ring 8.

In order to be able to rotate the worm shaft 6 back, it is merely necessary that the clamp lock screws 24 and 25 are loosened. Therefore, a troublesome separation as well as respective removal of the arrangement of the parts is not necessary. Consequently, the increase of the brake shoe clearance is easily obtained with the slack adjuster constructed in accordance with the first embodiment of the invention.

Figure 6:
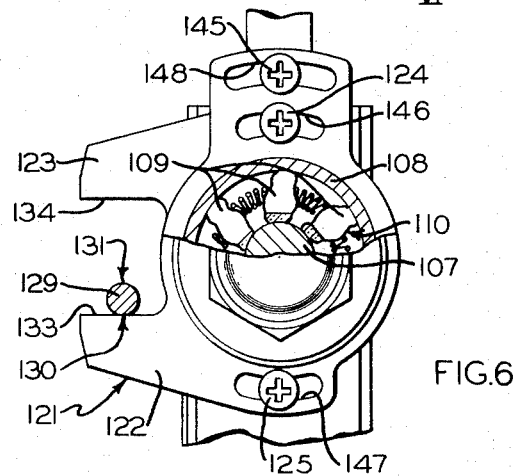
FIG. 6 shows a side view of the slack adjuster arrangement of FIG. 5 looking in the direction of the arrows VI in FIG. 5.
Figure 7:
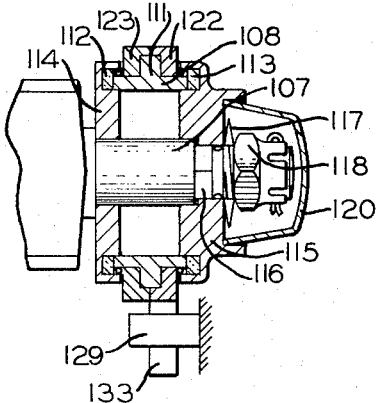
FIG. 7 is a cross-sectional view cut through the slack adjuster arrangement of FIG. 5 in accordance with the line VII—VII in FIG. 5.

The slack adjuster arrangement constructed in accordance with the second embodiment of the invention that is shown in the FIGS. 4, 5, and 6 differs in structure from the design constructed in accordance with FIGS. 1, 2, and 3 merely in that the construction of the slack adjusting lever 121 is such that it is adjustable.

Therefore, the lever parts 122 and 123 are provided respectively with contact surfaces 133 and 134 and also clamp lock screws 124 and 125. The lever parts 122 and 123 may also be connected one with the other by the means of the additional screw 145. The clamp lock screws 124, 125 and 145 extend through the arcuate shaped holes or slots 146, 147 and 148 in the one lever part 122 and have screw-threaded engagement with screw-threaded bores in the other lever part 123. With the clamp lock screws 124 and 125 released, the lever parts 122 and 123 can, by the means of tightening the screw 145, be clamped one with the other in such a manner that both lever parts 122 and 123 are unrotatable relative to each other. However, they are commonly rotatable on the coupling ring 108.

Otherwise the design in accordance with FIGS. 4, 5, and 6 is identical to that in accordance with FIGS. 1, 2, and 3 and therefore no further description thereof need be given. Identically designed parts are designated with 100 higher reference numbers in contrast to their corresponding reference numbers in FIGS. 1, 2, and 3.

Also the manner of operation of the slack adjuster arrangement in accordance with FIGS. 4, 5, and 6 is relatively identical to the slack adjuster function as that with the slack adjuster arrangement in accordance with FIGS. 1, 2, and 3 and therefore it is not further explained.

By the means of the loosening of the screws 124, 125, and 145, and the subsequent rotation of the lever part 122 counter to the other lever part 123 on the coupling ring 108, the clearance distance between both of the contact surfaces 133 and 134 and the stud 129, is altered so that the required arcuate rocking of the brake lever 2 for this brake lever to begin the slack adjustment is changed. Thereafter, both lever parts 122 and 123 once again are securely clamped to each other by the means of tightening of the clamp lock screws 124, 125 and 145.

If it is desired to increase the brake shoe clearance, then it is merely necessary that the clamp screws 124 and 125 are loosened, then both lever parts 122 and 123 remain clamped to each other by the means of the tightened clamp lock screws 145 but they, it is true, are released from the clamping ring 108. However, they are not rotatable relative to each other. Therefore, the adjustable clearance distance between the contact surfaces 133 and 134 is maintained. Likewise, the backward rotation of the worm shaft 106 to operate the slack adjuster for the purpose of the increasing of the brake clearance distance remains the same.

Having now described the invention, what I claim as new and desire to secure by Letters Patent, is:

1. In an automatic slack adjuster mechanism for a brake lever that is connected to a brake shoe cam shaft by a worm wheel carried on the cam shaft and a worm mounted on a worm shaft journaled in the lever, a stop member, a slack adjuster lever having limited movement with respect to said stop member, and an overrunning clutch releasably locking said slack adjuster lever to said worm shaft comprising a ring member concentric to said worm shaft and a plurality of locking members interposed between said ring member and said worm shaft operable to lock said ring member to said worm shaft upon rotation of said ring member in only one direction, wherein the improvement comprises:
   a. a collar formed integral with said ring member, and
   b. a first manually operable screw-threaded means for releasably securing said slack adjuster lever to said collar whereby said lever is rotatable relative to said collar when released therefrom to move said lever relative to said stop member.

2. An automatic slack adjuster mechanism, as recited in claim 1, further characterized in that said slack adjuster lever comprises two parts, each of which is rotatable with respect to said ring member when released therefrom by said manually operable screw-threaded means, and rotatable simultaneously with said ring member when secured thereto by said screw-threaded means.

3. An automatic slack adjuster mechanism, as recited in claim 2, further characterized in that said stop member and each of said parts of said slack adjuster lever is provided with a pair of contact surfaces, each of said surfaces on said lever parts movable into contact with one of said contact surfaces formed on said stop member, and by a second manually operable screw-threaded means for securing said two parts of said slack adjuster lever together while each is released from said collar by said first manually operable screw-threaded means to enable simultaneous rotation of said two parts of said slack adjuster lever relative to said ring member.

4. An automatic slack adjuster mechanism, as recited in claim 3, further characterized in that one of said slack adjuster lever parts is provided with a pair of parallel spaced-apart arcuate slots and the other is provided with a pair of screw-threaded bores, each in alignment with one of said slots, and that said first manually operable screw-threaded means passes through one of said slots and has screw-threaded engagement with that one of said screw-threaded bores that is in alignment therewith, and said second manually operable screw-threaded means passes through the other of said slots and has screw-threaded engagement with that one of said screw-threaded bores that is in alignment therewith.

5. An automatic slack adjuster mechanism, as recited in claim 4, further characterized in that each of said slack adjuster lever parts comprises an annular member disposed about said ring member, said annular members being disposed on the respective opposite sides of said collar and each having integral therewith and extending from one side thereof an annular flange that overlies and abuts said collar.

6. An automatic slack adjuster mechanism, as recited in claim 5, further characterized in that one of said slack adjuster lever parts has formed integral therewith an arm, the outer end of which is provided with a recess having a pair of parallel spaced-apart walls each of which constitute a contact surface movable into contact with said stop member to thereafter respectively cause operation of said overrunning clutch to release said slack adjuster lever from said worm shaft upon rocking of said brake lever in one direction through more than a chosen angle and to lock said slack adjuster lever to said worm shaft upon subsequent rocking of said brake lever in an opposite direction.

* * * * *